United States Patent

Golden

[15] 3,684,213

[45] Aug. 15, 1972

[54] SYSTEM FOR AUTOMATICALLY RETURNING TAPE TO A PRESELECTED POSITION

[72] Inventor: John R. Golden, 5424 E. 23rd St., Tulsa, Okla. 74114

[22] Filed: Dec. 7, 1970

[21] Appl. No.: 95,658

[52] U.S. Cl. ....................................242/201, 235/103

[51] Int. Cl. ............................B11b 15/32, G03b 1/04

[58] Field of Search..............242/186, 190, 201, 204; 250/219 R; 235/103

[56] References Cited

UNITED STATES PATENTS 2,998,939 9/1961 Scott ..........................242/188

*Primary Examiner*—Leonard D. Christian
*Attorney*—Head & Johnson

[57] ABSTRACT

A system for automatically returning a tape to a preselected position including means to generate a count responsive to the revolution of the tape supply reel, means of adding the count generated to obtain a count sum, means of reversing the movement of the tape from the forward to the rearward direction, means to generate a count responsive to the revolutions of the supply reels as the tape is moved in the rearward direction, means of subtracting the count generated as the tape is moved in the rearward direction from the count sum, and means of stopping the rearward direction of the tape when the count sum is zero.

2 Claims, 1 Drawing Figure

PATENTED AUG 15 1972 3,684,213
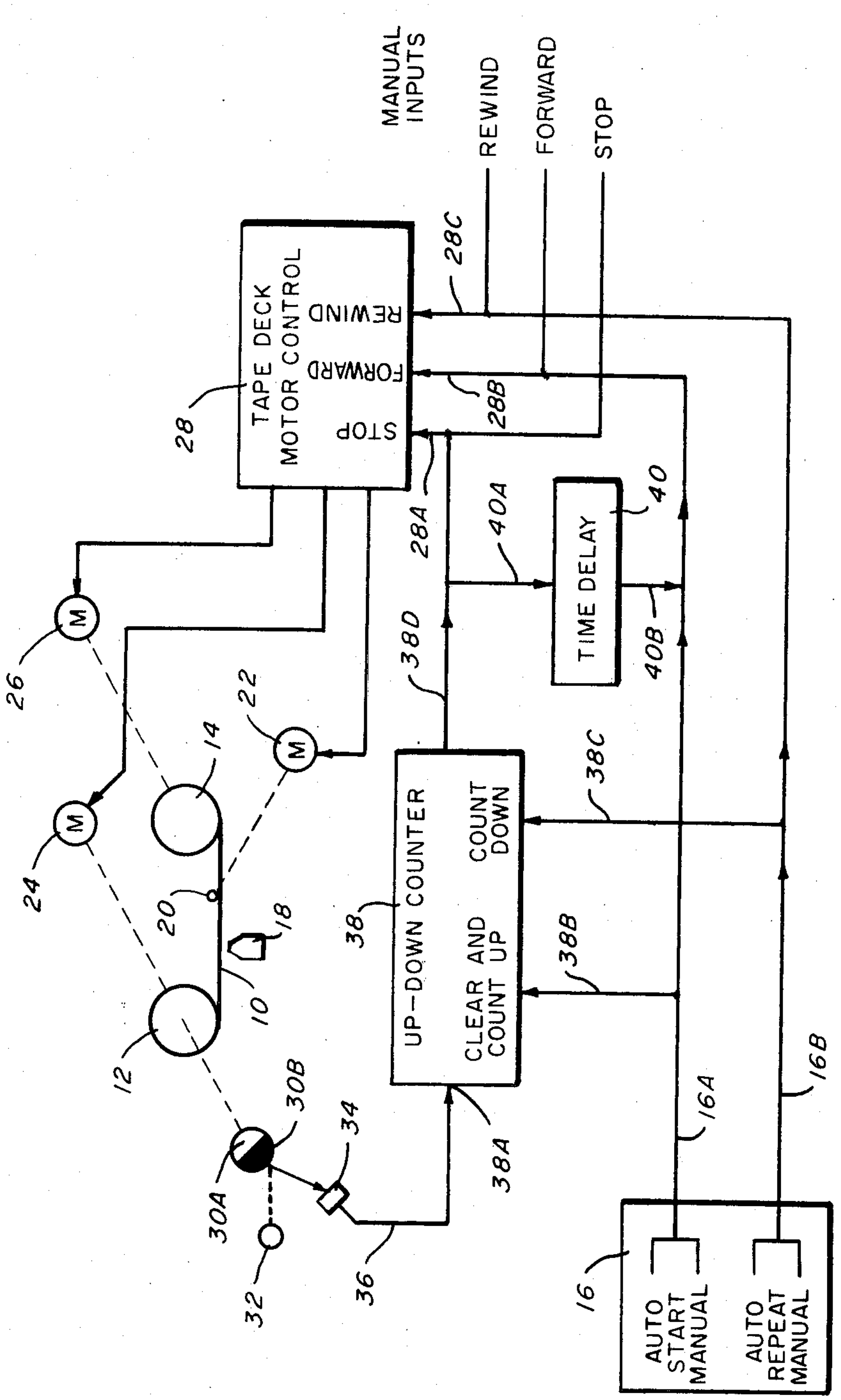
INVENTOR
JOHN R. GOLDEN
BY
Head & Johnson
ATTORNEYS

SYSTEM FOR AUTOMATICALLY RETURNING TAPE TO A PRESELECTED POSITION

BACKGROUND, SUMMARY AND OBJECTS OF THE INVENTION

It is sometimes important to be able to locate, by automatic means, the staring point of a just completed portion or segment of a tape. By the expression "tape" as used herein means any type of web advanced past a processing station from a supply spool reel to a takeup reel. Thus "tape" includes magnetic tape for recording and reproducing audio signals, filmstrip for projecting a sequence of pictures onto a screen, a plurality of slides arranged for sequential projection onto a screen, a moving picture film, a video tape film or a combination audio and visual display film.

A specific example of a need of this type equipment is encountered in audio-visual teaching-testing machines wherein a student receives information concerning a subject and then is tested for his grasp of the subject. A typical situation is that in which information is presented to a student in segments. After each segment the student is questioned by the audio-visual apparatus. If the student answers correctly he is permitted to proceed to the next segment. If, on the other hand, the student answers incorrectly then the preceding segment is repeated since the incorrect answer indicates that the student has not grasped the subject matter. The preceding segment may be repeated at the option of the student by manual indication or the preceding segment may be repeated automatically by the teaching machine apparatus upon the rendition of an incorrect answer.

Others have provided automatic means for returning a tape to a preselected position but all of the presently known systems have undesirable features. For instance, others have provided an electrically conductive or reflecting element attached to the tape surface. This system, while functioning satisfactorily as far as results are concerned, nevertheless introduces a foreign element onto the tape which can cause difficulties in tape handling equipment, such as to the read head if it is an audio tape or to the tape drive equipment if it is a filmstrip or motion picture projector. Still others have provided means for locating the beginning of a segment of tape by the utilization of control codes or tones impressed on the tape which are sensed by monitoring the tape as it is reversed, that is while the apparatus is in the rewind or reverse mode. This system requires the tape to pass contiguous to a tape head for the detection of such coded tone and requires precise head alignment and normally utilizes slower reverse or rewind speeds to permit effective searching for the coded tone signal. In addition, any arrangement which requires the tape to be in contact with a magnetic head as it is being rewound adds to the wear on the tape and the tape head.

This invention provides a means of automatically returning a tape to a selected position which overcomes the disadvantages and limitations of known existing systems, including those mentioned above.

It is therefore an object of this invention to provide an improved tape system having means for automatically returning a tape to a selected position.

A more specific object of this invention is to provide in a tape system having a supply reel, a takeup reel, a process station, means for advancing the tape in a forward direction past the process station by which the tape is would from the supply reel and onto the takeup reel, a means for rewinding the tape in a rearward direction by which tape is removed from the takeup reel and wound on the supply reel, and an improved means for automatically returning the tape to a preselected position.

These objects, as well as other objects of the invention will be fulfilled by the mechanisms, apparatus and systems to be described in the subsequent specification and claims, taken in conjunction with the attached drawing.

DESCRIPTION OF THE DRAWING

The drawing is a block diagram of a typical tape system having means for automatically returning the tape to a preselected position.

DETAILED DESCRIPTION

Referring to the drawing, a tape system having means for automatically returning the tape to a preselected position is shown. The tape system includes a tape 10 wound on a supply reel 12 and a takeup reel 14. As previously indicated the tape 10 may be a magnetic tape as utilized for reproducing audio signals, a filmstrip or motion picture film for projecting pictures, a combination motion picture film and audio reproduction system a video film or a combination video-audio film. For purposes of exemplification the invention will be described wherein the film 10 is utilized for audio reproduction. Further, the invention will be described as is particularly applicable to a teaching-testing machine. In this instance the film 10, which may be utilized alone or in conjunction with a visual display, includes a series of segments, which will normally be of varying lengths. In each segment a student is presented with information or instruction followed by a question designed to ascertain the student's grasp of the subject. The question may typically be of the multiple choice type. The student may respond and if a wrong answer is given such will be indicated. The teaching-testing machine, indicated by numeral 16, may be programmed to permit the student the option of repeating a segment to which a wrong answer is given by manually pressing a repeat button or it may be programmed to automatically repeat the segment to thereby prevent advancement of the teaching-testing process until the student has mastered each succeeding segment.

Tape 10 is driven past a process station 18 which, in the case wherein the tape 10 is an audio tape, is a magnetic head. The tape 10 is driven by some mechanism, such as a capstan 20, rotated by capstan motor 22. Supply reel 12 is driven by motor 24 and takeup reel by motor 26, the motors 22, 24 and 26 being controlled by a tape deck motor control circuit 28. The tape deck motor control circuit 28 includes manual and/or electrical means to place the apparatus in the stop, forward, or rewind modes.

The tape system and tape deck motor control circuit discussed to this point is more or less a standard tape system as utilized in a teaching-testing machine. This invention is to provide means of rewinding the tape 10 to a preselected position.

Affixed coaxially to supply reel 12 is a disc 30 having a reflecting surface portion 30A and a nonreflective surface portion 30B. The disc 30 turns with a supply reel 12. It can be seen that the disc 30 may easily as well be placed on the takeup reel 14 in which case the invention would function exactly the same. A light source 32 is positioned to direct a light beam onto disc 30. A photocell 34 is positioned to receive the light beam reflected from the disc 30. The photocell generates a pulse in response to each revolution of the disc 30 due to the difference in intensity of the light impinging upon the photocell. Thus photocell 34 generates a count pulse on conductor 36 which is independent of the direction of rotation of reel 12. Disc 30 is shown with one reflecting portion 30A and one nonreflecting portion 30B. Obviously the disc may have two or more reflecting portions alternating with a like number of nonreflecting portions, and in such event, the number of count pulses generated per revolution is determined by the number of reflecting portions.

An up-down counter 38 is provided having a count input 38A, a clear and count up input 38B, a countdown input 38C, and a stop signal output 38D. The teaching-testing machine has a start output 16A, which is connected to the up-down counter count up input 38B and also to the forward control circuit 28B of the tape deck motor control 28. The teaching-testing machine also has a repeat output circuit 16B which is connected to the up-down counter countdown input circuit 38C and to the tape deck motor control rewind circuit 28C.

A time delay circuit 40 having input 40A and output 40B is positioned between the up-down counter stop signal output 38D and the tape deck motor control forward circuit, the purpose of which is to provide a time delay between stopping and automatic restarting the tape. Time delay circuit 40 provides means of deriving an automatic restart forward signal from the tape stop signal.

OPERATION

It will be assumed, as previously indicated, that the system of the invention is utilized with an audio tape and as a part of a teach-testing machine 16. Tape starts upon a start signal given at output 16A, either automatically or manually supplied, which is conveyed simultaneously to the up-down counter 38 and to the tape deck motor control circuit 28. This causes tape 10 to start forward, advancing past process station 18, the tape being unwound from supply reel 12 and wound onto takeup reel 14. At the same time the signal clears the up-down counter to a preselected number, which in the simplest arrangement is zero. As the tape progresses, providing instructional information to a student as it moves past the station 18, disc 30 supplies count pulses as reel 12 rotates. This count signal is fed to up-down counter input 38A and is summed within the counter providing a continuous count sum. At the end of the instructional segment testing is initiated wherein the student is asked a question. Whether the response is correct or incorrect is indicated within the teaching-testing machine 16. An indication is usually given that the response is incorrect (if it is incorrect). The student may have the option of manually returning the machine to the beginning of the segment to again receive the instruction from such segment. This may be done by applying a manual signal to repeat signal outlet 16B. Or, the teaching-testing machine 16 may be programmed to automatically provide such signal when an incorrect response is given. In any event, the appearance of a repeat signal on conductor 16B is conveyed to the rewind circuit 28C of the tape deck motor control and simultaneously to the countdown input 38C of the up-down counter 38. The tape deck motor control circuit then drives supply reel motor 24 to rewind the tape, preferably at a fast rate so as to return the system to the teaching mode as quickly as possible. During such rewind it is not necessary that the tape 10 be contiguous with process station 18. As the tape is rewound a count input signal is applied at conductor 38A to the updown counter 38 in the same manner as when the tape is running in the opposite direction. In this instance however the updown counter subtracts one from the count sum for each count input pulse received. When the count sum reaches the initially preselected number (zero in the most common embodiment) a stop signal appears at output conductor 38D which is supplied to the stop signal input 28A of the tape deck motor control 28. This stops the tape. Thus the device provides means for stopping tape 10 at the preselected position without requiring any physical element such as a conductive, magnetic or reflective attachment to the tape 10 or without requiring any signal from the tape 10 and therefore the tape 10 need not be in contiguous relationship with any type of magnetic detection system.

The system optionally includes the time delay circuit 40 having input 40A connected to the up-down counter stop signal output 38D and output 40D connected to the tape deck motor control forward input 28B. By this arrangement, when a stop signal appears from up-down counter at output 38D there appears, after an appropriate delay, an automatic forward signal from time delay output 40B to automatically begin replay of the segment of the tape. When the time delay circuit 40 is not provided the tape may be started manually by means of a signal imparted at 16A or by other automatic means within the teaching-testing machine 16. The time delay circuit 40 may be replaced by logic circuits that prevent the forward signal from appearing until after tape 10 has stopped completely which may be determined by monitoring the count at conductor 36 for absence of pulses.

The tape deck including the mechanism shown and the tape deck motor control circuits 28 may be any apparatus capable of remote stop, forward and rewind functions and, may, as previously indicated, be magnetic tape or motion picture film. The same principles may be used to control the sequential projection of a series of slides on a screen by means of a slide projector.

The exact length of tape 10 for a single revolution of supply reel 12 will vary depending upon the amount of tape on the reel. This will not prevent returning to the same spot on the tape 10 as each count covers the same relative location on the tape whether the tape is counting up or down. The primary factors effecting accuracy of location of the preselected position on the tape are the tape stretch, tape tension, and speed of stopping, all of which can be controlled and compensated for.

One method of compensating for these problems is to provide a short pause or unrecorded portion between each segment of the tape to allow some overshoot in reversing to the previous segment beginning. Thus the tape will always stop within the blank area between segments.

Up-down counter 38 may be electronic or mechanical, however the use of electronic counting is most desirable. An electronic up-down counter 38 is a well known apparatus as utilized in industry today and is within the skill of the competent electrical engineer. The number of stages required in the up-down counter 38 is a function of the maximum length of tape segments to be repeated.

The system described allows the backing up of only one segment of the tape. All that is required in a typical teaching situation is that the student not be allowed to leave the particular segment until he has mastered it. Backup capabilities could be extended however, to two or more previously presented segments by providing auxiliary storage means for previous segment counts and additional logic for loading the up-down counter 38 with this count prior to reversing.

When a new tape segment presentation is initiated the count up signal applied at conductor 38B to the up-down counter serves two functions, that is to put the counter in the count up mode, and simultaneously to clear any existing count. Thus after the end of a segment a start signal, whether given manually or automatically always clears the previous count so that each segment begins with a new count accumulation.

While the invention has been described with a certain degree of particularity it is manifest that many changes may be made in the details of construction and the arrangement of components without departing from the spirit and scope of this disclosure. It is understood that the invention is not limited to the specific embodiments set forth herein for purposes of exemplification, but is limited only by the attached claim or claims, including the full range of equivalency to which each element thereof is entitled.

What is claimed:

1. In a tape system having a supply reel, a takeup reel, a process station, means for moving the tape in a forward direction past the process station by which tape is removed from the supply reel and wound on the takeup reel, and means for rewinding the tape in a rearward direction by which tape is removed from the takeup reel and wound on the supply reel, means for automatically returning the tape to any selected position, comprising:

means to generate a count responsive to the revolutions of one of the supply and takeup reels as the tape is moved in a forward direction, the count starting when the tape selected position is at the process station;

means of adding the count generated to the preselected number as the tape moves in the forward direction to provide a continuous count sum;

means of reversing the movement of the tape from the forward to the rearward direction;

means to generate a count responsive to the revolutions of the said one of the supply and takeup reels as the tape is moved in a rearward direction;

means of subtracting said counts generated as the tape is moved in the rearward direction from said count sum; and means of stopping the rearward direction of the tape when the count sum is zero.

2. A tape system having means for automatically returning the tape to a selected position according to claim 1 wherein said means of adding the count generated as the tape moves in the forward direction and means of subtracting the count generated as the tape moves in the rearward direction includes:

an electronic up-down counter having a count input connected to receive counts as the tape is moved in the forward and rearward directions, a count up signal input whereby a signal thereat causes the count to be added, a count down signal input whereby a signal thereat causes the count to be subtracted, and an output whereby a signal thereat stops the tape when the count is reduced to the preselected number.

* * * * *